Sept. 19, 1967  M. E. JORDAN ET AL  3,342,554
CARBON BLACK PRODUCT AND METHOD OF PREPARATION THEREOF
Filed June 20, 1963
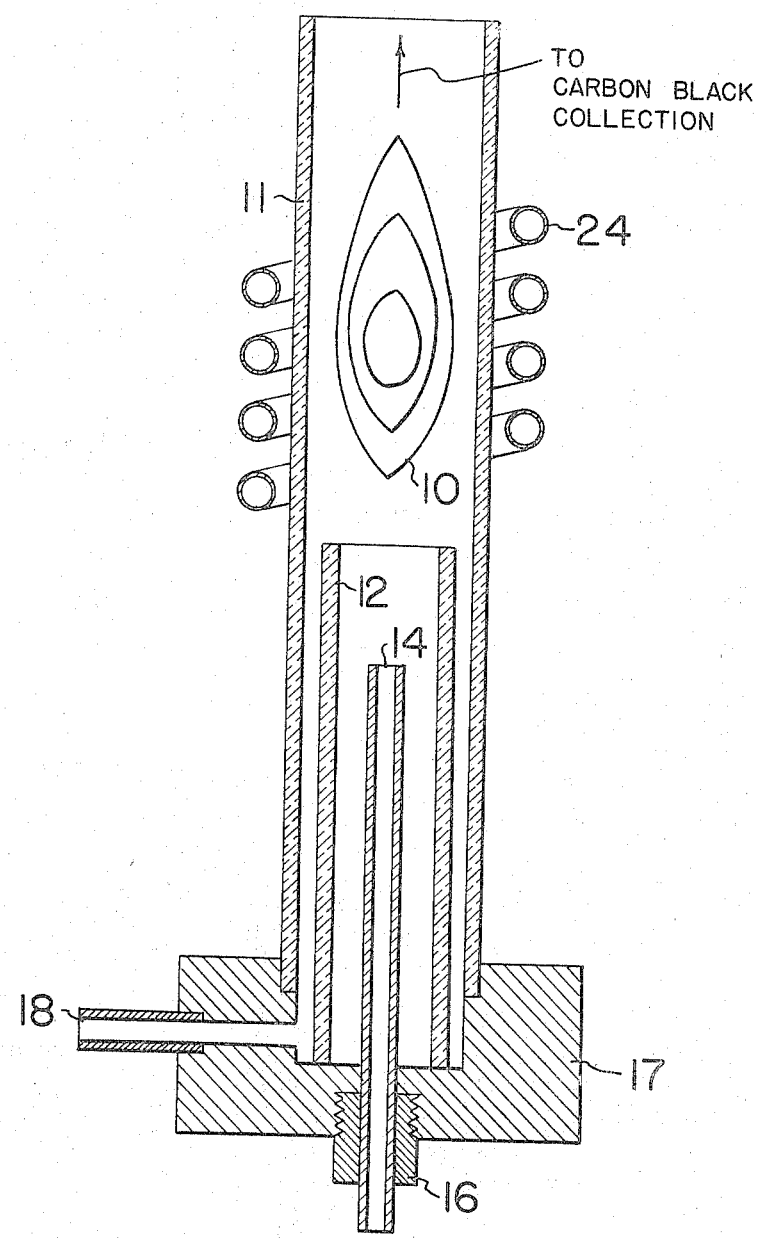
INVENTORS
M. E. JORDAN, H. M. COLE, W. G. BURBINE, D. L. PETTERSON
BY

United States Patent Office 3,342,554
Patented Sept. 19, 1967

3,342,554
CARBON BLACK PRODUCT AND METHOD OF PREPARATION THEREOF
Merrill E. Jordan and Harvey M. Cole, Walpole, William G. Burbine, Whitman, and David L. Petterson, Wollaston, Mass., assignors to Cabot Corporation, Boston, Mass., a corporation of Delaware
Filed June 20, 1963, Ser. No. 289,350
7 Claims. (Cl. 23—209.2)

This invention relates to carbon black. More precisely the invention disclosed herein relates to a method for producing carbon blacks at unusually high temperatures and to the novel carbon products resulting therefrom.

Commercially carbon black is produced by the thermal decomposition of carbon containing materials which are usually essentially hydrocarbon in nature. The thermal decomposition of the carbonaceous material can be achieved by various processes such as open flame decomposition (impingement or channel), enclosed direct flame decomposition (furnace), externally heated surfaces (continuous thermal) or detonation or internal combustion processes (engine or energy utilizing systems), etc. In any of the above-mentioned processes, the temperatures involved rarely exceed about 3000° F. The basic properties of a black, and, therefore, the performance characteristics exhibited thereby in the application thereof, are determined in large measure by the particular process by which it is produced. For example, channel blacks or impingement type blacks, which are produced in the presence of air at temperatures of about 1700° F., are generally characterized by high surface area, low structure, high volatile content and low pH, and are particularly suitable for use as coloring agents, and as reinforcing agents in natural rubber. On the other hand, carbon blacks, produced in an enclosed conversion zone at temperatures of about 2500° F., e.g. by the furnace process, may be produced over a wide range of closely controlled particle sizes and accordingly are adaptable as fillers for various synthetic rubbers and plastics. In view of the many well known applications for carbon blacks as finely divided fillers and/or pigments, any process which can insure the uniform production of novel carbon blacks having desirable properties would be a notable contribution to the art.

The principal object of the present invention is to provide a carbon product of new and unusual properties.

Another object of the present invention is to provide novel carbon blacks which are useful as fillers of pigments.

Another object of the present invention is to provide a new process for selectively and precisely producing carbon blacks or pigments of unusual and desirable properties.

Still another object of the present invention is to provide a new process for producing a novel carbon black from hydrocarbonaceous starting materials which process permits an almost complete recovery of the carbon content thereof.

Other objects of the present invention will in part be obvious and will in part appear hereinafter.

The above objects and advantages are obtained in accordance with the teachings of our invention essentially by decomposing a fluid hydrocarbon in an extremely high temperature zone created by ionization of a gas. More precisely and most preferably the objects and advantages of our invention are realized by continually introducing a fluid hydrocarbon into a zone wherein a gas is subjected to sufficient electrical energy to maintain the gas in a thermal plasma state.

For the purposes of the present invention the term "thermal plasma state" means that state obtained when a monatomic gas such as helium, neon, zenon, radon and preferably argon, or a diatomic gas such as nitrogen, hydrogen, etc. is introduced to a zone at a pressure of about one atmosphere or higher and subjected to sufficient high frequency electrical energy in the zone so that from about 10 to about 50% of atoms therein are ionized. When such gases exist in the thermal plasma state, temperatures ranging from about 6000° K. to about 20,000° K. or somewhat higher are established in portions of the plasma zone. Accordingly, the thermal plasma state is in decided contrast with conventional plasmas which are encountered in neon lights, etc., due to the extremely high temperatures involved in the former because of the higher pressure of gas present during the ionization thereof.

Many manners are known whereby monatomic or diatomic gases may be ionized to maintain same in the thermal plasma state. For example, the best known method of initiating such a plasma is that wherein an A.C. or D.C. current of many thousands of amperes is passed through the gas occupying a region between two electrodes. Another method of producing a thermal plasma involves the use of the electrode type plasma torch in which the gas is passed around one of the electrodes and then permitted to pass through a hole in the second electrode thereby producing a plasma which may be directed outside the electrode zone. We have found that the most advantageous method of establishing the plasma state for the purposes of our invention is best obtained by an electrodeless discharge technique. In accordance with this technique the thermal plasma state is achieved by heating the gas to ionization temperatures by means of electrical induction created preferably by a surrounding coil carrying radio frequency current. In accordance with the above-mentioned technique, a finite zone is established within the confines of the reactor wherein the monatomic gas, upon passing therethrough, will exist in the thermal plasma state. By adjusting and maintaining the flow rate of the gas and the input of power, the size of the zone wherein the gas exists in the plasma state may be modified and/or enlarged so that it effectively occupies a substantial cross-sectional portion of the reactor. Thus, the thermal plasma state is established and maintained at a precise location in the reactor, and hydrocarbons may be introduced directly thereto in a manner which insures the best contact conditions between the hydrocarbon and the high energy, thermal plasma. This preferred method of producing the thermal plasma state will be discussed and described in more detail hereinafter.

We have discovered that the nature of the make hydrocarbon introduced to the plasma zone and the nature of the atmosphere in the plasma zone are critical factors which determine the production of carbon black in accordance with the teachings of our invention. In the practice of our invention we have found that only those carbonaceous materials commonly referred to as fluid hydrocarbons may be utilized to produce carbon black products in yields which roughly correspond to the theoretical amount of carbon in the make. For example, we have found that those carbonaceous compounds which contain substantial amounts of oxygen or sulfur do not produce suitable yields of carbon black when decomposed by means of the energy derived from the thermal plasma state. However, when those raw materials which contain compounds consisting essentially of carbon and hydrogen are decomposed in accordance with our invention in the absence of any substantial amounts of oxygen or sulfur (whether these substances be derived from compounds in the fuel or otherwise), the yield of black obtained closely approximates the total amount of carbon in the make.

Obviously those fluid hydrocarbons which usually inherently contain minor amounts of the above-mentioned substances may be utilized in accordance with our invention if desired especially where the diminution in yield would not justify elaborate techniques required to remove the offensive impurities or compounds containing same. Accordingly, suitable fuels for the practice of our invention include methane, ethane, ethylene, butane, butylene and the higher homologues of the saturated and unsaturated hydrocarbons and fuels containing same in large concentrations. Our invention will be better understood by reference to the drawing which illustrates an arrangement of apparatus, suitable for practicing our invention.

Referring now to the drawing, the apparatus illustrated therein comprises a localized reaction zone 10 which for the purposes of conducting small scale operations, may be enclosed by a quartz tube 11 of almost any desired I.D., such as from about 25 mm. to about 40 mm. or even somewhat larger. In larger scale production, the reaction zone may be of different cross-sectional shape and also may be surrounded by other refractory type materials with the choice of the particular material depending in large measure upon the temperatures encountered at the walls of the reaction zone and upon the ability of the material to permit effective transfer of sufficient electrical energy to ionize the gas. Axially aligned with the localized reaction zone 10 and, more precisely, leading concentrically to the lower portion thereof is a tube 12 of smaller outside diameter than the internal diameter of tube 11. Tube 12 which is preferably of quartz or other high temperature resistant materials should be of sufficient outside diameter and be fixed concentrically within tube 11 so as to provide an annular space between the inner walls of tube 11 and the outer walls of tube 12. Concentrically positioned within tube 12 is tube 14 which generally terminates short of the upper end of tube 12 and is of considerably smaller diameter than tube 12. Tube 14, which may be of metal, extends through the base 17 of the apparatus and communicates in air tight fashion with hydrocarbon feed line 16. When tube 14 is of metal, means for raising and lowering the tube in the reaction zone should preferably be provided. Tube 18 introduces the gas to the lower portion of the space formed between tubes 11 and 12, preferably tangentially. The gas thus moves upwardly through the space and upon passing from this space continues upwardly in a generally spiralling direction through tube 11 with the greater portion thereof remaining in close proximity to the inner walls of tube 11. In this manner a low pressure area is created in the center and aids in stabilizing the plasma and permits a greater portion of the hydrocarbon to be fed into the central regions of tube 11. Positioned above tube 12 and about the outer walls of tube 11 is cylindrical coil 24 which is generally of copper and which is preferably hollow to permit cooling liquid to flow therethrough. The coil 24 in the illustrated apparatus may consist of from about 4 to about 7 or 8 turns or more depending upon the size and shape of the reaction zone and the flow of high frequency current needed therefor. For example, when a diatomic gas is ionized, greater energy is required to first dissociate the gas and then ionize the dissociated particles. Less energy is required for the monatomic gases which although they have higher ionization temperatures, nevertheless do not dissociate but rather are ionized directly. The coil is connected to a source of high frequency current, e.g. a generator (not shown). Generally current frequencies of about 3 to 5 megacycles are sufficient for accomplishing suitable results with monatomic gases in the apparatus illustrated.

In the operation of the described apparatus, the gas, generally argon, is fed tangentially under suitable positive pressure (generally greater than about 1 atmosphere) into the space between the outer walls of tube 12 and the inner walls of tube 10. When the desired flow rate is attained, the high frequency current is supplied to coil 24. If tube 14 is of metal, then it may be raised into the area of the coil 24 and will be heated therein by the high frequency field. In turn, the heated metal heats the gas around it making the gas more conductive and concentrating the field. The heat is sufficient to create a localized plasma which in turn almost immediately raises the temperature of the gas within the reaction zone to ionizing temperatures thereby establishing a thermal plasma within the coil area. An alternative method for starting the plasma involves placing a tantalum wire or a wire of any other metal or carbon rod in the center of the coil 24 and withdrawing same after the plasma has been initiated. After the plasma is established in the reaction zone, tube 14 is located in approximately the position shown in the drawing. Thereafter a fluid hydrocarbon is fed through tube 14 into the plasma zone at the desired feed rate. Almost all of the hydrocarbon passes through the central portions of the plasma because of the vortex created by the preferred manner of introducing argon to the reaction zone.

We believe that the hydrocarbon is subject to essentially complete dissociation and ionization during its passage through the plasma zone. So long as substantial amounts of oxygen or other like contaminants are excluded from the reaction zone and the area immediately preceding same, high yields of black are obtained for most hydrocarbons which in some cases corresponds approximately to the theoretical recovery of carbon therefrom. It will be noted that the exclusion of oxygen and air is insured in accordance with our invention partly by the manner of introducing the gas to the reaction zone. By introducing the argon so as to maintain a layer of essentially undiluted argon at the relatively cool peripheral regions of the reaction zone, the dissociation products of the hydrocarbon are quenched immediately after passing through the reaction zone, thereby arresting the reaction under conditions most favorable to the production of high yields of carbon.

In accordance with the teachings of our invention we have produced a wide variety of carbon blacks, a few of which somewhat resemble conventional blacks, but most of which are decidedly unique, having characteristics which do not conform to any conventional blacks known heretofore. For example, by conducting the process of our invention under conditions which insure the delivery of a major portion of the make fuel to the higher temperature regions of the plasma zone and also insure sufficient residence time of the make therein, we are able to produce from most hydrocarbon fuels a carbon black which is characterized by a small particle diameter comprised of crystallites having large crystallite dimensions but which, quite surprisingly, are lacking in crystalline order. In other words, the blacks which are produced in the region of the plasma where the higher temperatures are encountered are characterized by smallness of particle size yet largeness of individual crystallite dimensions. Thus, these blacks contain only relatively few crystallites per particle yet the crystal planes lack order relative to one another or, more specifically, they are turbostratic. This is most surprising in view of the state of the art. For example, it is well known that most carbon blacks are generally highly graphitized (or ordered in crystallite arrangement) if they have been subjected to temperatures in excess of about 2700° C. In contrast thereto, the predominate portion of our black product, although produced at temperatures probably in excess of about 8000° K. and in some cases at temperatures as high as about 15,000° K., do not manifest any appreciable graphitization. This observation has been verified by X-ray diffraction studies of our blacks wherein the lack of modulations in the ($hk$) reflection indicates the absence of graphitization or preferential crystallite order thereof. Moreover, electron microscope observations of some of our blacks indicate an unusual particle shape namely flat, thin particles resembling crinkled film material such as cellophane and yet having a relatively small average equivalent particle diameter which rarely exceeds about 35 millimicrons. However, quite surprisingly, despite their small particle size the blacks are readily dispersible in oils, inks, polymers, paints, etc.

Although we are unable to explain precisely why such unusual properties should characterize the blacks produced in accordance with our invention, we believe that these properties are a direct result of the unusual environment in which they are formed. As stated before, this environment is characterized primarily by the substantial absence of oxygen or sulfur and by the existence of high energy ionized particles therein which upon recombination, produce unusually high temperatures, e.g., temperatures of at least about 8000° K. The temperatures are far in excess of those involved in known carbon black production processes including those involving the use of electric arcs. Thus, the blacks produced in accordance with our invention are formed under conditions which are well beyond those barriers which normally define conventional carbon black processes. That such unusual environmental conditions impart novel properties to blacks produced therein will be more readily appreciated from the following table which compares the crystallite arrangement and related properties of such blacks and those of conventional carbon blacks. In the table below, the $L_a$ and $L_c$ peak dimensions are obtained from X-ray diffraction evaluations of representative blacks. The $L_a$ peak dimension is indicative of the average diameter of the crystalline while the $L_c$ dimension is a measure of the average thickness thereof.

polymeric materials or as high color pigments in paint vehicle systems. Accordingly, the blacks of our invention are especially useful and desirable in those applications where a fine but inert pigment or filler is required.

In order that those well skilled in the art may better understand and practice our invention, the following illustrative examples are presented. In each of the following examples, apparatus similar to that set forth in the drawing was utilized. A 20 kw. Lepal high frequency convertor was used to supply power through a 7 turn copper coil 24 of ¼″ O.D. copper tubing surrounding a 40 mm. O.D. silica tube 11. A 3″ diameter Pyrex tube, not shown, was suspended above the quartz tube with a ¼″ vertical separation. In turn the Pyrex tube was attached to suitable collection equipment including Pyrex cyclones and a bag filter. The flow of exhaust gases and produce carbon was directed through the collection system by means of an exhaust fan drawing approximately 10 cm. $H_2O$ reduced pressure. The monatomic gas in all cases was argon and the argon was introduced to the quartz tube 11 tangentially by means of a tube similar to tube 18. The breakdown potential of the argon flowing through the energized zone 10 was lowered by introducing a conducting wire thereto through the vertical separation between the quartz tube 11 and the 3″ Pyrex tube. With the introduction of the wire, the argon ionizes and then couples, thereby setting up a high temperature thermal plasma zone in the quartz tube. The wire was then removed. The hydrocarbon make was introduced to the

TABLE I.—REPRESENTATIVE DIMENSIONS OF CARBON BLACKS

| | Nitrogen Surface Area, $M^2$/gram | Average $L_c$ dim. (A.) | Average $L_a$ dim. (A.) | Average $L_a/L_c$ | Average Part. Diam. (A.) | Volume Average Part. ($A.^3$) | Volume Average Crystallite ($A.^3$) | Average Number of Crystallites/ Particle |
|---|---|---|---|---|---|---|---|---|
| Channel Grade: Spheron 6 | 110 | 13 | 23 | 1.77 | 280 | 1.14×10⁷ | 5.2×10³ | 2,100 |
| Furnace Grade: Vulcan 3 | 74 | 14 | 24 | 1.71 | 290 | 4.7×10⁷ | 6.35×10² | 7,400 |
| Sterling S | 23 | 15 | 26 | 1.73 | 800 | 2.68×10⁸ | 8×10³ | 33,400 |
| Thermal Grade: Sterling FT | 13 | 17 | 28 | 1.61 | 2,150 | 5.14×10¹ | 1.5×10⁴ | 500,000 |
| Shawinigan Acetylene | | 26.6 | 47.5 | 1.79 | 500 | 65.3×10⁶ | 4.7×10⁴ | 1,400 |
| Plasma Blacks: | | | | | | | | |
| PB 21 | 91.5 | 37 | 51 | 1.38 | 352 | 2.3×10⁷ | 7.5×10⁴ | 300 |
| PB 23 | 76.6 | 53 | 70 | 1.32 | 422 | 3.9×10⁷ | 2×10⁵ | 200 |

It is obvious from Table I that the crystallite parameters of the plasma blacks of our invention listed therein differ greatly from the conventional blacks. For example, our plasma blacks have $L_a/L_c$ ratios below about 1.5 whereas most blacks have ratios between about 1.6 and 2.0 or somewhat higher. Moreover, Table I also discloses that our blacks differ from known blacks in that they contain a very small average number of crystallites per particle. We consider the paucity of crystallites per particle one of the most unusual characteristics of our blacks since this characteristic imparts properties thereto which especially recommends our blacks for specific applications. It is well known that the reactivity of a carbon black is determined to a large extent by the number of crystallites per particle of the black, probably because the carbons inside of a crystallite are not as reactive as those at the crystallite rims or edges. For example, most small particle size blacks such as channel blacks, usually contain many crystallites per particle and hence many more active sites are available for reaction. In contrast thereto, our plasma blacks which have an average number of crystallites per particle of less than 1000, have available fewer such sites and are therefore less reactive at equivalent particle size. Accordingly, our plasma blacks and especially those which have an average number of crystallites per particle less than about 500 have greater resistance to $O_2$, do not readily absorb moisture, and do not interefere with reagents such as vulcanizing agents, drying agents or the like which are incorporated into the composition in which the black is used as a filler or pigment. In conjunction with the above properties, our blacks are of sufficiently small particle size so that they can effectively serve as reinforcing agents in plasma zone separately from the argon by means of tubes similar to tubes 16, 14 and 12. The tube 14 from which the hydrocarbon is released had an I.D. of about 8 mm. and the hydrocarbon was released therefrom at a velocity of about 39 mm./sec. which we have found is especially suitable for insuring sufficient residence time for the hydrocarbon in the plasma zone.

*Example 1*

In apparatus similar to that described above, argon was introduced continually to the tube tangentially at a rate of about 20–30 ft.³/hr. After establishing a thermal plasma zone within the confines of the tube, butene-1 was introduced to the zone continually at a rate of about 0.25 ft.³/hr. The run continued for 1 hour. At the conclusion of the run, 15 grams of carbon black were recovered from the collection system.

The black produced was evaluated and found to have the following properties:

Run #PB–21:
    Electron microscope part. diam. (millimicrons) _____ 35
    $N_2$ surface area ($M^2$/gram) _____ 91.5
    Scale _____ 87
    Oil absorption (cc./gram) _____ 1.82

X-ray diffraction patterns of the black revealed no trace of graphitization and that the $L_a$ dimension was 51 angstroms while the $L_c$ dimension was 37 angstroms. Accordingly, the ratio of $L_a$ to $L_c$ was about 1.38.

Example 2

Substantially the same procedure as described in Example 1 was followed but in the present run, ethane instead of butene was introduced to the plasma zone. The run continued for about one hour. At the conclusion of the run, 7 grams of carbon black were recovered from the collection system. The properties of the black were evaluated and found to be as follows:

Run #PB-23:

| | |
|---|---|
| Electron microscope part. diameter (millimicrons) | 42 |
| $N_2$ surface area (M²/gram) | 76.6 |
| Scale | 88 |
| Oil absorption (cc./gram) | 1.62 |

X-ray diffraction patterns of the black revealed no trace of graphitization and that the $L_a$ dimension was 70 A. while the $L_c$ dimension was 53 A. Thus, the ratio of $L_a/L_c$ was about 1.3.

Many modifications and variations in some of the details illustrated, in order to explain our invention may be made by those skilled in the art without departing from the spirit and scope of our invention as defined in the appended claims.

Having described our invention what we declare as new and desire to secure by U.S. Letters Patents is as follows:

1. A process for making carbon black comprising (a) electrically inducing heating of a stream of inert gas to a thermal plasma state of at least about one atmospheric pressure wherein from about 10 to about 50% of said gas is in an ionized state, thereby forming a zone suitable for carrying out high temperature reaction and (b) continuously feeding a fluid hydrocarbon into said zone thereby causing the decomposition of said hydrocarbon to form carbon black.

2. A carbon black product made by the method defined in claim 1 and characterized by a thin, crinkled-film-shaped particle.

3. The process of claim 1 wherein the said inert gas is introduced selectively to the peripheral regions of said conversion zone.

4. The process of claim 1 wherein the said gas is an inert monatomic gas.

5. A process for producing carbon black comprising the steps of:
 (a) continually introducing an inert gas tangentially to the inner peripheral regions of an enclosed zone at a rate sufficient to establish a pressure of said gas of at least 1 atmosphere in said zone,
 (b) continually conducting about the outer peripheral boundaries of said zone a radio frequency current sufficient to heat said gas to the ionization temperatures thereof, thereby maintaining said gas in a thermal plasma; about 10 to about 50% of said gas being in an ionized state,
 (c) introducing a fluid hydrocarbon fuel to the central portions of said zone, and
 (d) collecting the carbon black produced.

6. The process of claim 5 wherein the said hydrocarbon is introduced to the central portions of said zone at a velocity of no greater than about 80 mm./second.

7. The process of claim 6 wherein the said gas is a monatomic gas.

References Cited

UNITED STATES PATENTS

| | | | |
|---|---|---|---|
| 2,564,700 | 8/1951 | Krejci | 23—209.4 |
| 2,919,370 | 12/1959 | Giannini et al. | 313—231 |
| 3,009,783 | 11/1961 | Sheer et al. | 23—209.3 |

OTHER REFERENCES

Hellund: "The Plasma State," Reinhold Publishing Corp., New York, copyright 1961, pp. 93–94.

OSCAR R. VERTIZ, *Primary Examiner.*

E. J. MEROS, *Assistant Examiner.*